United States Patent [19]
Muntz et al.

[11] Patent Number: 5,742,649
[45] Date of Patent: Apr. 21, 1998

[54] SRTS CLOCK RECOVERY SYSTEM FOR USE IN A HIGHLY STRESSED NETWORK ENVIRONMENT

[75] Inventors: Gary S. Muntz, Lexington; Stanley A. Lackey, Jr., Groton, both of Mass.

[73] Assignee: Cisco Technology, Inc., San Jose, Calif.

[21] Appl. No.: 573,297

[22] Filed: Dec. 15, 1995

[51] Int. Cl.⁶ .................................................. H03D 3/24
[52] U.S. Cl. ........................ 375/371; 375/356; 375/226; 370/516; 370/508
[58] Field of Search ................................ 375/371, 356, 375/226; 370/503, 506, 508, 516

[56] References Cited

U.S. PATENT DOCUMENTS

4,961,188 10/1990 Lau .
5,260,978 11/1993 Fleischer et al. .

*Primary Examiner*—Wellington Chin
*Assistant Examiner*—Congvan Tran
*Attorney, Agent, or Firm*—Cesari and McKenna, LLP

[57] ABSTRACT

An improved SRTS clock recovery system of a network node that adjusts the range of a received source RTS sample and a locally generated destination RTS sample to compensate for inherent characteristics of a network system. In addition, the improved system extends the range of the RTS samples to properly interpret large phase differences between a source node clock and transmit clock generated by the network node. This novel technique for interpreting source and destination RTS samples enables the improved network node to accurately recover a source clock frequency from a network transmission in a highly stressed network system. Specifically, the SRTS clock recovery system includes an RTS sample interpreter having a slope determinator for determining the expected average change in source and destination RTS samples over time. A slope compensator of the interpreter scales the range of RTS sample slopes to compensate for this expected average change in samples, thereby increasing the range of usable RTS sample slope values, while a range extender increases the number of phase values that the RTS sample slopes represent to accommodate large phase differences between the source and destination clock frequencies.

27 Claims, 5 Drawing Sheets

SRTS CLOCK RECOVERY SYSTEM FOR USE IN A HIGHLY STRESSED NETWORK ENVIRONMENT

RELATED APPLICATIONS

The following applications are related to the present application.

U.S. patent application entitled "SYSTEM AND METHOD FOR MAINTAINING NETWORK SYNCHRONIZATION UTILIZING DIGITAL PHASE COMPARISON TECHNIQUES WITH SYNCHRONOUS RESIDUAL TIME STAMPS", attorney docket number 112023-0004, naming as inventors Gary S. Muntz, Steven E. Jacobs, and Guy Fedorkow, assigned to the assignee of the present invention and filed concurrently herewith.

U.S. patent application entitled "AN IMPROVED SRTS CLOCK RECOVERY SYSTEM IMPLEMENTING ADAPTIVE CLOCK RECOVERY TECHNIQUES", attorney docket number 112023-0005, naming as inventors Gary S. Muntz and Steven E. Jacobs, assigned to the assignee of the present invention and filed concurrently herewith.

FIELD OF THE INVENTION

The present invention relates generally to network system clock recovery, and more specifically, to a novel synchronized residual time stamp (SRTS) clock recovery technique having improved jitter tolerance.

BACKGROUND OF THE INVENTION

An area of network communications that has been evolving since the 1980's is the area of integrated services digital network (ISDN) systems. Since its inception, ISDN has provided a wide variety of services, including voice and data services with bit rates of up to 64 Kbps, integrated within a single network. For voice communications and many text and data applications, the 64 Kbps ISDN rate is sufficient. However, there are increasing demands for broadband communications with substantially higher bit rates such as, for example, high-speed data communications, video, and high resolution graphics communications. Thus, a second generation of ISDN, referred to as broadband ISDN (B-ISDN), has developed to support these latter types of communications while still providing the same advantages of the first generation ISDN.

The first generation ISDN utilizes a synchronous transfer mode wherein, for the duration of a connection, a synchronous channel with constant bit rate (CBR) is allocated to that connection. Although suitable for certain applications, synchronous transfer mode is generally unsuitable for integration of those latter service types which have bit rate requirements above 2 Mps. This has lead to the development of asynchronous transfer mode (ATM) as the preferred method for transferring information in a B-ISDN system. ATM is a method wherein a user's data is partitioned into fixed-length cells for transmission without a specified timing requirement, thereby enabling cell transfer over a synchronous or asynchronous network.

Voice, video, image and high-speed data communications require high-speed transmission capabilities to support associated high-bandwidth requirements; optical transmission systems are especially suitable for this purpose. Accordingly, B-ISDN systems typically employ synchronous optical network (SONET) technology as a transport system. The International Telecommunications Union Telecommunications Standardization Sector (ITU-T, formerly the CCITT) essentially describes a B-ISDN network as a system implemented with ATM and SONET technologies built on the concepts of the ISDN model.

Figure 1:
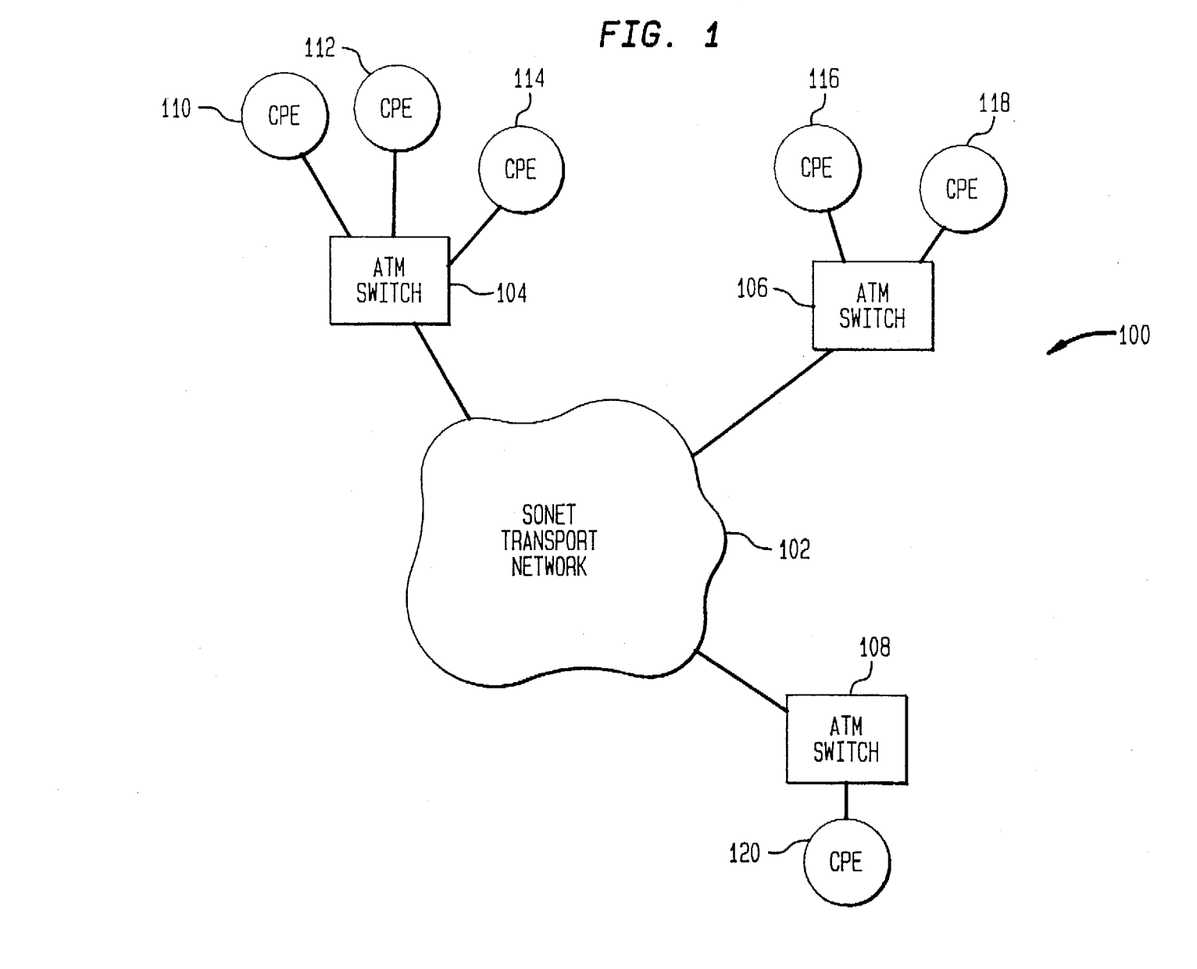
FIG. 1 is a high level block diagram of a typical broadband integrated services digital network (BISDN)

FIG. 1 is a block diagram of an exemplary B-ISDN network. Network 100 includes a SONET physical carrier transport system 102 for transporting data between ATM switches 104, 106 and 108. ATM switches 104–108 provide a network interface for a user's customer premises equipment (CPE), such as a PBX or local computer. In the exemplary network of FIG. 1, ATM switch 104 couples CPEs 110, 112, and 114 with network 102, while ATM switches 106 and 108 connect CPEs 116, 118 and 120, respectively, to that network. The function and operation of ATM switches 104–108, also referred to as ATM nodes, are described further herein.

Figure 2:
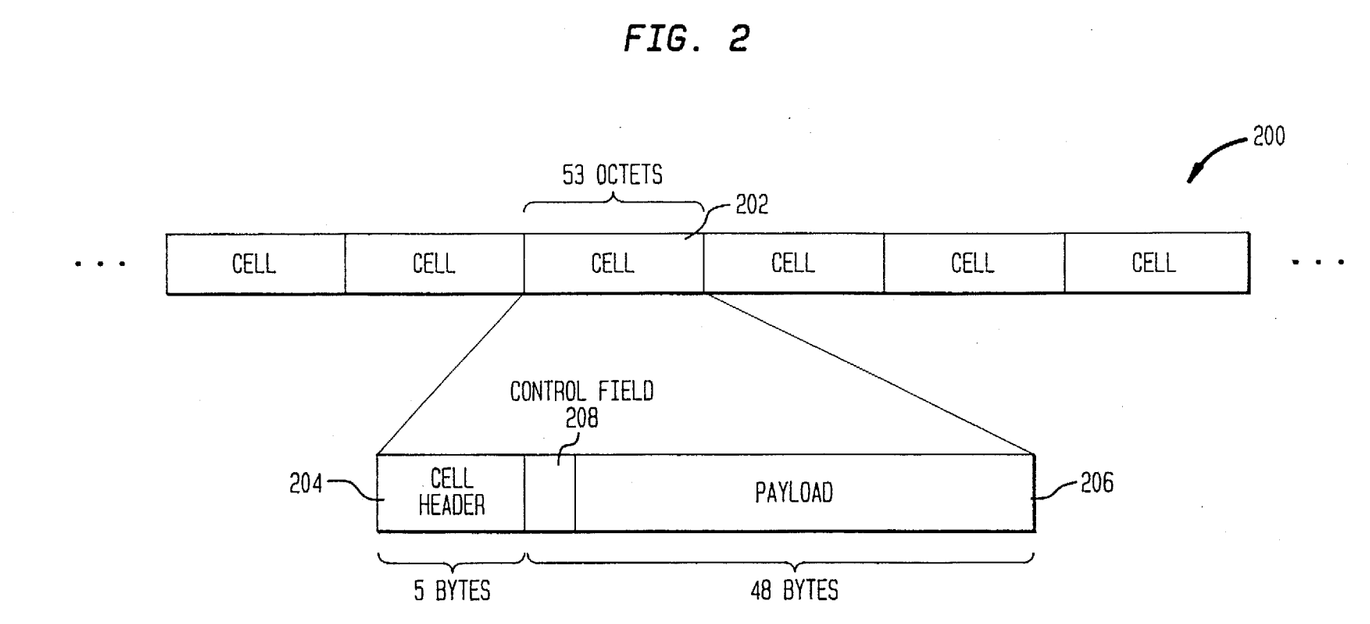
FIG. 2 is a block diagram of an ATM cell transmission, illustrating the fields of an individual ATM cell.

In contrast to the circuit switching orientation of the first generation ISDN, B-ISDN has a cell relay or packet-switching orientation. FIG. 2 illustrates a format of a cell-based transmission 200 generated by an ATM switch such as switch 104. Cell-based transmission 200 includes a plurality of cells 202, each of which has a size of 53 bytes, including a 5-byte header 204 and a 48-byte payload 206 of user data. Header 204 is generally used for achieving transmission over network 100 and, to that end, includes information pertaining to such functions as routing and traffic control. Segmentation of the data into cells results in an integrated approach to networking, providing flexibility for handling different types of information such as voice, data, image and video over a single transmission facility 102.

One of the many types of services which can be supplied by network 100 is a circuit emulation service, wherein user data flows through the network at a constant bit rate (CBR). This service typically uses ATM Adaptation Layer 1 (AAL1), which is specifically designed for CBR applications. Control information required for these operations is included in a control field 208. In the illustrative embodiment, control field 208 is a 1-byte field located in the 48-byte payload 206 dedicated to user data in each cell 202. Bits in successive control fields can optionally be used to convey a Residual Time Stamp (RTS), used in applications employing SRTS clock recovery. Depending on the implementation, source CPE 308 may provide AAL1 segmentation and reassembly, or those functions may be provided by source ATM switch 304.

Timing variations inevitably exist among the network components. High frequency variations, referred to as jitter, are typically reduced to manageable levels through the use of jitter filters in each node. Low frequency variations, referred to as wander, are typically dealt with in a network through the use of buffers located within the nodes of the network. Specifically, these buffers store a small amount of data, allowing it to build up or be drained by small-magnitude wander without data loss or errors. When wander exceeds the capacity of the buffers they either repeat (i.e., underflow) or discard (i.e., overflow) blocks of data to compensate for differences in timing between the source and destination nodes. Underflow and overflow operations, generally referred to as slip, typically result in errors within the network. For example, in a voice circuit, slip may be detected by popping or clicking sounds, whereas in data transmissions, slip is manifested in the loss of data. Very large buffers can reduce the probability of such errors, but they increase the delay through the network. Delay is undesirable, so buffer size is minimized.

Various clock recovery techniques have been developed to maintain network synchronization to avoid such loss of data. A technique commonly used in BISDN systems implementing ATM is the synchronous residual time stamp (SRTS) clock recovery method. One conventional SRTS clock recovery method is described in U.S. Pat. No. 5,260,978 to Fleischer et al., (hereinafter "Fleischer").

The SRTS clock recovery technique discussed in that patent carries timing information, in the form of a residual time stamp (RTS), through the network along with the data transmission. The SRTS clock recovery system residing in the destination node uses the timing information to recover the frequency of the source node clock and to generate a transmit clock having a frequency at which the destination node transmits the data to a destination user process.

At the source node, an RTS sample is generated representing the phase between the source node clock and the network reference clock. Once the RTS sample is conveyed to a destination node with a data transmission, the destination node attempts to reconstruct the source node clock frequency by generating a local RTS sample and comparing it to the received RTS sample. The difference between the two RTS values is utilized to directly control an oscillator generating the transmit clock. A feedback loop is provided to enable the above process to be continually repeated to maintain the transmit clock frequency near the source node clock frequency.

The term "residual" stems from the fact that this technique actually sends a value representing the residual part of the phase difference information. This approach is based on the assumption that the nominal part of the derived reference clock is known at the source and destination nodes due to the common availability of the network reference clock. A 4 bit RTS sample has been established as the standard by the ATM Forum to transmit the residual phase difference information while consuming a minimal amount of bandwidth. The local RTS sample generated by the SRTS clock recovery system located in the destination node is also 4 bits in length for proper comparison to the received RTS sample as noted above.

A 4-bit RTS sample has 16 values ($2^4=16$) with a range of 0 through 15. Conventional SRTS clock recovery systems scale the range of the RTS sample, typically sign-extending it from bit 3, resulting in an RTS sample range of +7 to −8. Over time, the symmetrical nature of jitter results in RTS sample values extending over the range of available values, with the average RTS sample value equal to the average of the selected range. Thus, using the above range to interpret a RTS sample indicates an inherent assumption that the average change in the RTS sample is −0.5 (i.e., (+7+(−8))/2=−0.5).

In many cases, the average change in the RTS sample value is substantially different from −0.5. Jitter from the source node and reference timing system is tolerated by the destination module to the extent it can correctly interpret the RTS values it receives and generates. Therefore, any difference between the true and assumed average change reduces the tolerance for jitter in the system. Jitter tolerance in conventional systems is limited by the false assumption that the average change in RTS sample value is −0.5. In these systems, jitter from various sources may combine to exceed the capacity of the destination module, causing permanent phase errors in the transmit clock. These errors will accumulate, generating excess wander and data errors over time.

Another drawback to conventional SRTS clock recovery systems similar to that disclosed in Fleischer, is the inability of the destination node to respond to large phase variations, such as those experienced in highly stressed network systems. In such network systems, the source and destination node may generate valid RTS samples. However, if jitter results in a large phase difference between the source and transmit clocks, conventional SRTS clock recovery systems cannot adjust the frequency of the transmit clock at the rate necessary to maintain pace with the large RTS sample changes without causing undue perturbations in the transmit line. Thus, the phase difference cannot be properly represented by the 4-bit RTS sample utilized in conventional SRTS clock recovery systems, thereby preventing them from recovering the source node clock frequency. This also results in excess wander and data errors over time.

What is needed, therefore, is an SRTS clock recovery system that can accurately interpret the RTS samples in network environments with substantial jitter. This jitter tolerance must be maximized at the stage of sample comparison and must track potentially large phase shifts between source and destination clocks. With such improvements, the performance and reliability of SRTS will be strengthened, ultimately expanding its utility.

SUMMARY OF THE INVENTION

The present invention comprises an improved SRTS clock recovery system of a network node that adjusts the range of a received source RTS sample and a locally generated destination RTS sample to compensate for inherent characteristics of a network system. In addition, the improved system extends the range of the RTS samples to properly interpret large phase differences between a source node clock and transmit clock generated by the network node. This novel technique for interpreting source and destination RTS samples enables the improved network node to accurately recover a source clock frequency from a network transmission in a highly stressed network system.

Specifically, the SRTS clock recovery system includes an RTS sample interpreter having a slope determinator for determining the expected average change in source and destination RTS samples over time. A slope compensator of the interpreter scales the range of RTS sample slopes to compensate for this expected average change in samples, thereby increasing the range of usable RTS sample slope values, while a range extender increases the amber of phase values that the RTS sample slopes represent to accommodate large phase differences between the source and destination clock frequencies.

In addition, the SRTS clock recovery system includes an RTS sample generator for generating the destination RTS sample and a cell/packet receiver for retrieving the source RTS sample from a received information stream transmitted by the source node. In the illustrative embodiment each of the RTS samples is provided to a dedicated RTS sample interpreter configured to generate a compensated extended range RTS sample. These extended range samples are then compared to determine a current RTS sample difference between the source and transmit clocks. The current RTS sample difference is further compared to a target RTS sample difference to generate an error signal that is provided to a clock generation system.

The cell/packet receiver receives and parses the incoming information stream into an RTS sample and data portion, both of which are loaded into FIFOs at the rate they are processed. The clock generation system retrieves the data from the FIFO at the transmit clock frequency generated by the clock generation system in response to a control value generated by the SRTS timing controller. By maintaining a constant phase offset between the source and destination clocks, the frequencies of the receive clock of the source node and the transmit clock of the destination node are synchronized, thereby providing constant bit rate service.

Advantageously, the SRTS clock recovery system of the present invention scales the range of RTS sample slopes to compensate for an expected average change in samples. This increases the range of usable RTS sample slope values that can represent jitter, thereby enabling the present invention to accurately recover the source clock in a highly stressed network. That is, the inventive technique shifts the RTS sample slope to center about an anticipated RTS sample slope, thereby increasing the ability of the SRTS clock recovery system to correctly recognize and interpret RTS sample slope values with substantial jitter.

Another advantage provided by the improved SRTS clock recovery system is the utilization of an expanded range of RTS sample values to represent the phase difference between the source and reference clock signals. Such an extended range allows the SRTS clock recovery system to track potentially large phase shifts between source and destination clocks commonly found in highly stressed network environments.

Collectively, the novel slope compensator and range extender features of the RTS interpreter enable the network node implementing the SRTS clock recovery system to correctly recover the source clock even when stressed by various jitter frequencies, regardless of the source of jitter in the network. Specifically, the above slope compensation technique enables the network node to properly function in substantial medium-frequency jitter environments whereas the range extension function enables the network node to generate a transmit clock frequency that matches a source node clock frequency having a substantial low-frequency jitter component.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

For a fuller understanding of the nature of the invention, reference should be had to the following detailed description taken in connection with the accompanying drawings, in which.

DETAILED DESCRIPTION OF THE PREFERRED EMBODIMENTS

A. System Environment

Figure 3:
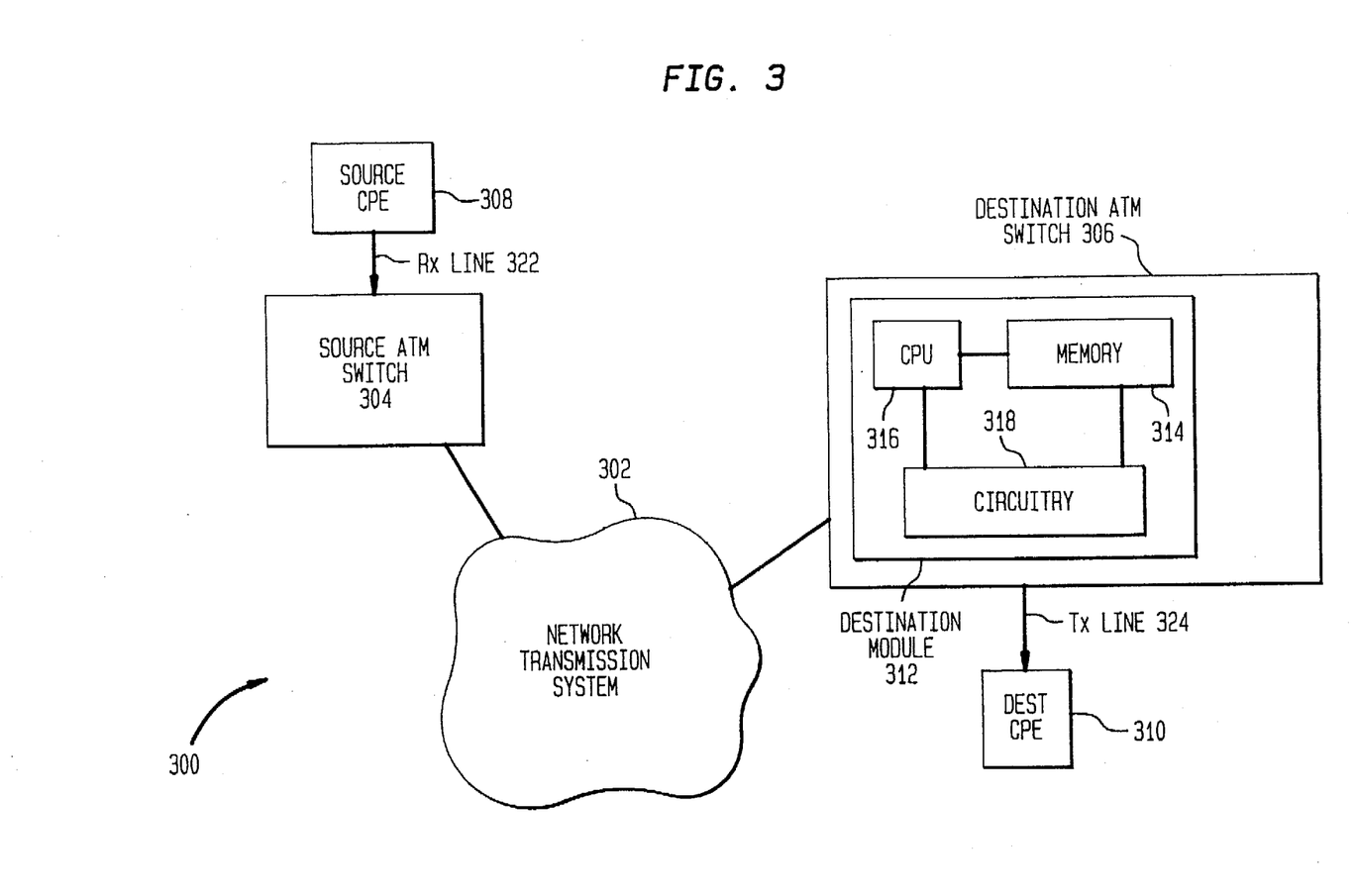
FIG. 3 is a high level block diagram of a BISDN system implementing the source and destination nodes of the present invention.

FIG. 3 is a block diagram of a network system 300 wherein the preferred embodiments of the present invention are implemented. Network system 300 comprises a plurality of nodes, some of which interface customer premises equipment (CPE) to the network. The nodes comprise a source node 304, a destination node 306, and a plurality of other nodes not shown.

Generally, source node 304 receives user information from source CPE 308 via receive line 322 for transmission over network transmission system 302 to destination CPE 310. Source node 304 processes the information for proper transmission over network 302 and then transfers that information to destination node 306 as a network transmission through network system 302. Destination node 306 receives and processes the network transmission, providing the user information to destination CPE 3 10 via transmit line 324.

The source CPE provides the source node with a transmit signal that includes the source information and a receive line clock. In the illustrative embodiment, receive line clock is a T1 line clock signal operating at 1.544 MHz. In alternate embodiments the receive clock signal may be an E1 clock signal, operating at 2.048 MHz. However, as would be apparent to one skilled in the relevant art, the receive clock may be any clock frequency associated with network 300.

In the illustrative embodiment, network transmission system 302 may have one or more network reference clocks, at least one of which is made available to both source node 304 and destination node 306. In such an embodiment, source node 304 may also generate an RTS sample. The RTS sample is a standard 4 bit value representing the phase offset between the network reference clock and the receive clock provided to the source node. The source node combines the RTS sample with the data and places them in the necessary format appropriate for the type of network 300. In the preferred embodiment wherein source node 304 is an ATM switch, the 4 bit RTS sample is placed in alternating successive control fields 208 of cells 202. However, as would be apparent to one skilled in the relevant art, the RTS sample information may be transmitted in any form consistent with the type of network 300. Furthermore, the phase offset information may be represented by forms other than an RTS sample.

Destination node 306 comprises a destination module 312 of the present invention and a number of other components not shown. Destination module 312 inches a number of interoperable elements, including a central processing unit (CPU) 316, a memory unit 314, and circuitry 318. Destination module 312 may be configured to perform an improved SRTS clock recovery technique that implements a unique digital phase comparison technique described below. An alternative preferred embodiment includes the destination module being configured to perform adaptive clock recovery (ACR), synchronous network clocking (SNC), as well as SRTS techniques. In the preferred embodiment of the present invention, a large portion of destination module 312 is implemented in an application specific integrated circuit (ASIC). However, as would be apparent to those skilled in the relevant art, destination module 312 may be implemented in any manner appropriate for a particular application. Furthermore, in the preferred embodiment of the present invention, network system 300 is a B-ISDN network system. Accordingly, source and destination nodes 304, 306 are preferably ATM switches and network transportation system 302 is a SONET system. However, as one skilled in the relevant art would find apparent, the invention may be implemented in any network system.

B. Destination Module

Figure 4:
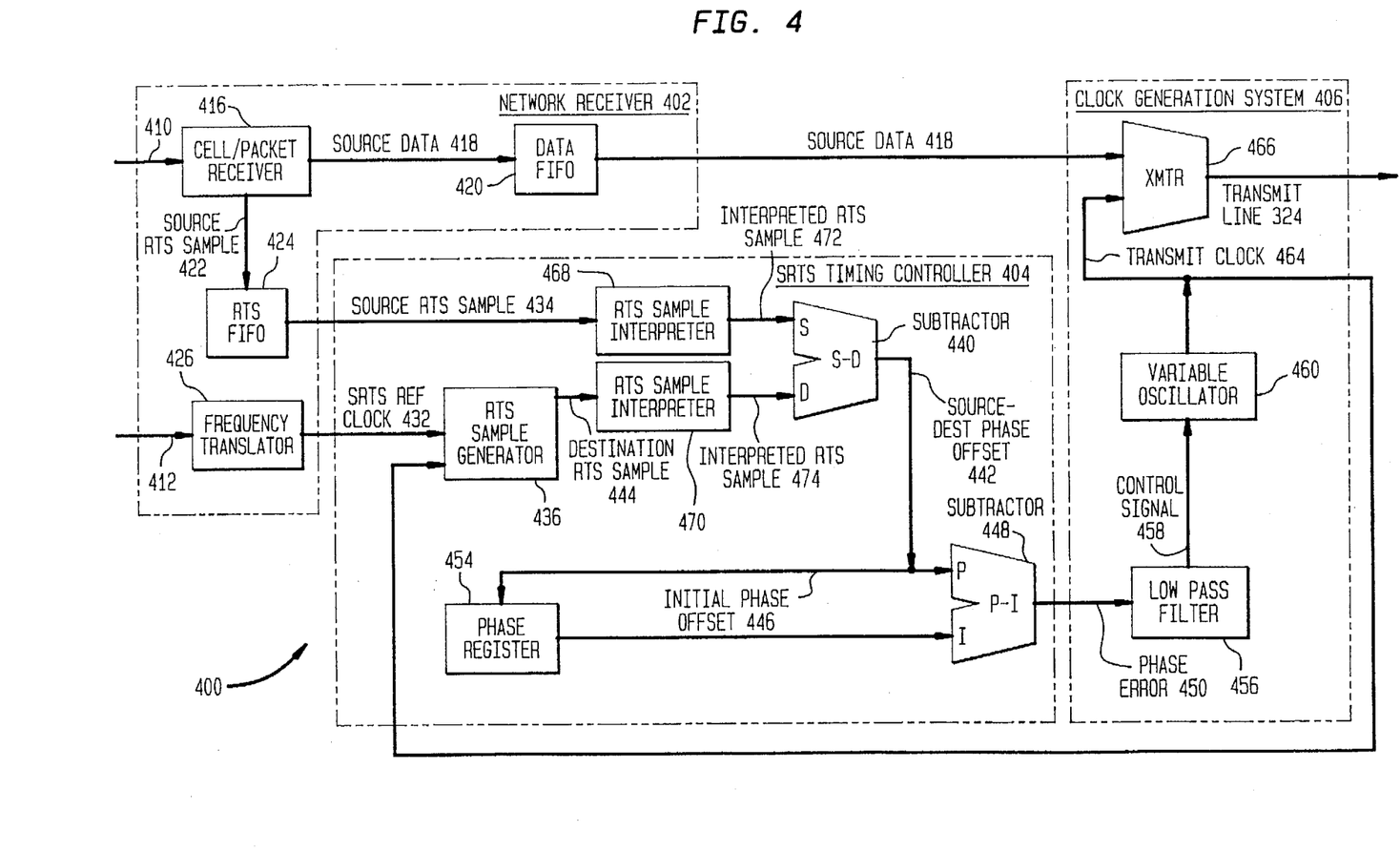
FIG. 4 is a schematic block diagram of the preferred embodiment of the destination module SRTS clock recovery system of the present invention.

FIG. 4 is a functional schematic block diagram of the SRTS destination module 312 of the present invention.

SRTS destination module 312 ensures proper reception and transmission of information over a network having a system reference clock by maintaining a constant phase difference between the destination node transmit clock and the source node receive clock, thereby forcing their frequencies to be identical. The SRTS destination module includes a network receiver 402, an SRTS timing controller 404, and a clock generation system 406.

Generally, network receiver 402 receives network transmissions including source data intended for destination CPE 310, and a network reference clock 412. Network receiver 402 performs various functions to ensure proper reception of the network transmission and provides data and control signals to SRTS timing controller 404 and clock generation system 406. Network receiver 402 includes a cell/packet receiver 416 coupled to a data FIFO 420 and an RTS FIFO 424, and a frequency translator 426. The network information received at network receiver 402 includes an ATM cell transmission 410 and a network reference clock 412.

Upon receipt of an ATM cell transmission 410 containing an RTS sample, cell/packet receiver 416 parses the incoming ATM cell transmission into a source RTS sample portion 422 and a source data portion 418. Since network traffic may result in a burst of incoming cells followed by a period of no activity, a phenomenon referred to as cell delay variation (CDV), the received cell transmission is loaded into FIFOs upon receipt. This enables the destination module to transmit the received bursts of data at an independent transmission rate appropriate for destination CPE 310. That is, cell/packet receiver 416 loads source data 418 and source RTS sample 422 into data FIFO 420 and RTS FIFO 424, respectively. Once loaded in their respective FIFOs, the source data and RTS sample are thereafter available to clock generation stage 406 and timing control stage 404, respectively.

Network reference clock 412 is processed by frequency translator 426 to generate an SRTS reference clock 432. In the exemplary embodiment, network reference clock 412 is the T1 clock rate of 1.544 MHz. Frequency translator 426 generates a 2.43 MHz SRTS reference clock 432 based upon the 1.544 MHz network reference clock 412. In the preferred embodiment of the present invention, frequency translator 426 is implemented in a phase lock loop (PLL), the function and operation of which is considered to be well known to those skilled in the relevant art. However, as would be apparent to one skilled in the art, frequency translator 426 may utilize other translation methods to create a suitable SRTS reference clock 432 from network reference clock 412. It should be noted, however, that a PLL is preferred due to its ability to control jitter and phase transients in the reference clock distribution system.

SRTS timing control stage 404 includes an RTS sample generator 436, RTS sample interpreters 468, 470, subtractor 440, phase register 454, and subtractor 448. SRTS timing controller 404 receives source RTS sample 434 and SRTS reference clock 432 from network receiver 402. In addition, SRTS timing control stage 404 receives a transmit clock 464 generated by clock generation stage 406 (discussed below).

RTS sample generator 436 generates a destination RTS sample 444 based upon SRTS reference clock 432 and transmit clock 464. Destination RTS sample 444 represents the phase offset between the SRTS reference clock 432 and transmit clock 464. As would be apparent to one skilled in the relevant art, RTS sample generator 436 may be implemented in any manner sufficient to generate an appropriate RTS sample for comparison with source RTS sample 434. Furthermore, the function and operation of RTS sample generator 436 is considered to be well known to those skilled in the relevant art.

Source and destination RTS samples are processed by RTS sample interpreters 468, 470, respectively. RTS sample interpreters adjust the range of the respective RTS sample slopes to compensate for a predetermined expected average change in value, referred to as the nominal slope. The range interpreters also extend the range of the RTS samples to properly interpret larger phase differences between the source and transmit clocks. The RTS sample interpreters enable SRTS clock recovery system 312 to accurately recover a source clock frequency from a network transmission in a highly stressed network system. Each RTS sample interpreter (discussed in detail below) generates an interpreted RTS sample 472, 474.

Interpreted destination RTS sample 474 is subtracted from interpreted source RTS sample 472 to determine a source-destination phase offset 442. To perform this function, interpreted source RTS sample 472 is provided to a source input of subtractor 440 while the interpreted destination RTS sample 474 is provided to a destination input of subtractor 440. Subtractor 440 generates source-destination phase offset 442, representing the difference between source and destination RTS samples 472, 474. As would be apparent to one skilled in the art, the functions performed by subtractor 440 may be implemented in any combinatorial logic or software process appropriate to a particular application.

When the destination module begins operation, typically shortly after a circuit is established, the source-destination phase offset 442 initially generated by subtractor 440 is referred to as an initial phase offset 446. The initial source-destination phase offset represents the phase offset between the source and destination at the moment the constant bit rate circuit is established. This phase offset must be preserved to guarantee a constant bit rate service between the source and destination nodes of the network, while minimizing phase transients on transmit line 324. Therefore, the initial RTS phase difference 446 is a target phase offset that is to be maintained as long as the circuit is in use. Since some RTS sample generators produce an erroneous RTS sample immediately following initialization, the second source RTS sample received by the SRTS destination module is considered to be the first reliable, and thus the initial, RTS sample. Thus, the phase offset 442 produced from the second source RTS sample is loaded into phase register 454.

To determine RTS phase error 450, initial RTS phase offset 446 is transferred from phase register 454 to the initial input of subtractor 448. Likewise, phase offset 442 is transferred from subtractor 440 to the current input of subtractor 448. Subtractor 448 generates a phase error 450 representing the change in source and destination node synchronization experienced since initial RTS phase offset stored in phase register 454 was determined. That is, phase error 450 is an indication of how many reference clock "units" transmit clock 464 is out of synchronization with the source node receive clock. The unit of phase is a single reference clock tick at the SRTS reference clock frequency of 2.43 MHz. Successive source and destination RTS samples are compared each time a new destination RTS sample is created.

Clock generation system 406 generates transmit clock 464, the frequency at which the source data is transmitted to destination CPE 310. Clock generation system 406 adjusts the frequency of the transmit clock in accordance with the value of phase error 450. Clock generation system 406 includes a low pass filter 456 for filtering RTS phase error 450, a variable oscillator 460 for generating transmit clock 464 based upon a control signal 458, and a transmitter 466 for transmitting source data 418 at the frequency of the transmit clock generated by the variable oscillator.

In the preferred embodiment of the present invention, the low pass filter 456 is a digital low pass filter configured to remove high frequency components from the RTS phase error signal 450. However, as one skilled in the art would find apparent, the low pass filter may be implemented digitally, with analog circuitry, or with a combination of digital and analog elements. It should be noted, however, that digitally filtering the phase error enables the present invention to filter a large frequency range from the error signal, including low frequency components not easily addressed by analog filters. The function and operation of the low pass filter 456 is considered to be well known to those skilled in the relevant art.

Variable oscillator 460 provides an appropriate transmit clock frequency, such as a T1 or E1 frequency, with a small offset proportional to the value of control signal 458. It is considered to be apparent to those skilled in the art that variable oscillator 460 may be any commonly known numerically controlled oscillator (NCO) or other type of variable oscillator now or later developed and that the variable oscillator may be implemented in digital, analog, or a combination of digital and analog elements. For example, a phase lock loop (PLL) may be used in conjunction with additional circuitry. It should be noted however, that the preferred digital implementation, an NCO, desirable over the analog implementation due to its increased stability with respect to voltage, temperature, and aging of the circuit. Furthermore, in the preferred ASIC implementation of the destination module, an all-digital variable oscillator is considerably less costly and more efficient to manufacture.

As noted, source data 418 previously buffered in data FIFO 420 is retrieved by transmitter 466 for transmission over transmit line 324 to destination CPE 310 at the rate of transmit clock 464.

Figure 5:
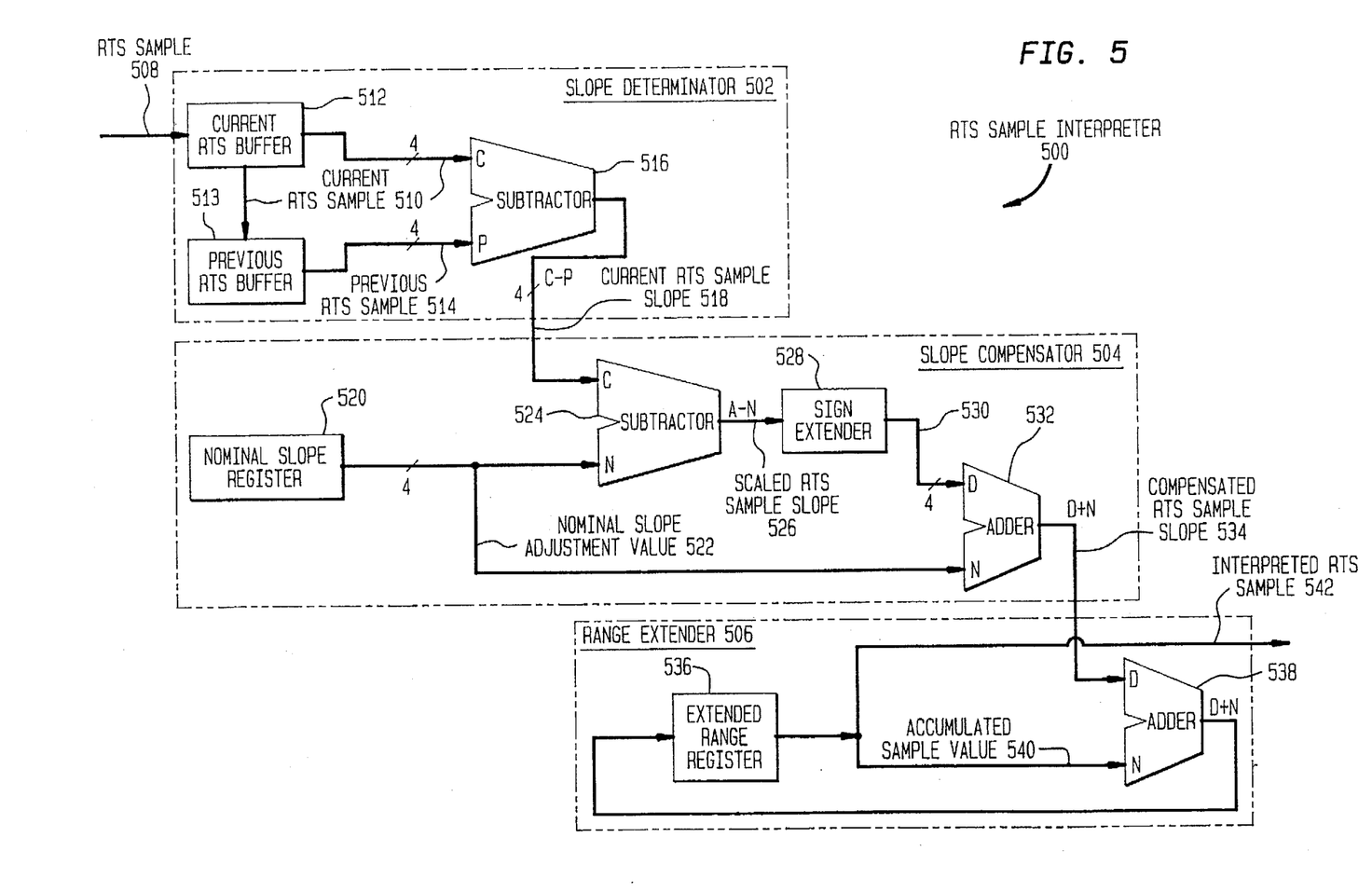
FIG. 5 is a functional block diagram of the RTS sample interpreter of the present invention implemented in the SRTS clock recovery system of FIG. 4.

FIG. 5 is a functional block diagram of the preferred embodiment of the RTS sample interpreters of the present invention. The RTS sample interpreters are comprised of a slope determinator 502, a slope compensator 504, and a range extender 506. Each of these functional elements is described below.

Before the arrival of an RTS sample 508, the current RTS sample 510 is loaded into a previous RTS buffer 513 for storage. Then, upon receipt by slope determinator 502, an RTS sample 508 is loaded into a current RTS buffer 512. The previously received RTS sample 514 is then subtracted from the current RTS sample 510 by a subtractor 516 to determine the difference between the two RTS samples. Specifically, current RTS sample 510 is transferred from current RTS buffer 512 and provided to a current input of subtractor 516. Likewise, previous RTS sample 514 is transferred from previous RTS buffer 513 to a previous input of subtractor 516. Subtractor 516 thereafter generates a current RTS sample slope 518, representing the difference between current and previous RTS samples.

As noted above, the RTS sample interpreters also include an RTS slope compensator 504. Current RTS sample slope 518, provided to RTS slope compensator 504, is a 4-bit value having a range of 0 to 15. Sample compensator 504 scales the anticipated range of the RTS sample slope to compensate for the nominal slope, which is determined by the nominal line rate and SRTS reference clock. Interpreting the RTS sample in light of the nominal slope enables the network node to provide a larger range of RTS sample values that can represent jitter and, therefore, accurately recover the source clock regardless of the amount (up to a limit) or source of jitter in the network transmission.

As noted, in conventional SRTS clock recovery systems, the source and destination RTS samples are used to directly control an oscillator that generates the transmit clock. As noted, the 4-bit RTS slope has a range of 16 values ($2^4=16$). These conventional SRTS systems typically sign extend the value from bit 3, resulting in the RTS slope having a range from +7 to −8, with the MSB being the sign bit.

Due to the oscillating nature of jitter, over time jitter will results in RTS slope values that extend over the range of available values and will have an average value equivalent to the average of the allowed range. Thus, using this constant range in which to interpret an RTS sample slope implies that the average change in the RTS sample slope is −0.5 ((+7+(−8))/2 =−0.5), or approximately zero.

The inventors have discovered, however, that the average RTS sample slope, as experienced at the destination node, is not zero. The inventors determined that there is a certain expected average RTS sample slope value, referred to as the nominal slope. Through a series of experiments utilizing simulated ideal network systems, the inventors have determined that for T1, the expected average RTS sample slope is −1.92. For an E1 network system, the nominal slope is 1.06. In other words, if the phase of the source node clock does not change from one network transmission to a successive network transmission, one can anticipate an increase or decrease in the RTS sample in accordance with the applicable nominal slope.

Thus, in conventional system the incorrect underlying assumption that the average RTS sample variation over time is −0.5 and the associated RTS sample range of +7 to −8 does not provide a range of 16 usable RTS sample values to interpret the RTS samples. For example, consider a conventional system carrying an E1 SRTS circuit. The expected average sample slope is 1.06, yet the maximum slope value expressed in the system is +7. The maximum difference between nominal and actual slopes is +7−1.06, or about 6 units. This difference is the amount of positive jitter the system can carry without error. Because jitter is symmetrical over time, the minimum slope which is truly useful to express is 1.06 −6, or about −5. The range of slope values expressed in the system goes down to −8, so about 3 of the 16 values are wasted. The system could accurately track at least 7 units of jitter in either direction if the range of expressed slope values were better aligned to the range of values expected on the line.

To see the consequence of overrunning the range of accurate sample interpretation, consider an example. The system described in the previous paragraph receives a positive peak of jitter, making the slope +8 between the previous and current samples. The conventional system cannot express this slope correctly, so it is perceived as −8. Where the clock in fact gained 7 units of phase, the SRTS system mistakenly perceives that it lost 8. So an error of 16 phase units is made, and this error is permanent and cumulative. The most likely result is an eventual shift of 16 phase units between the clock on the receive Line 322 and the transmit Line 324, violating the terms of the constant bit rate service. In systems implementing the slope compensation of the present invention, in place, however, this slope of +8 is correctly expressed and interpreted, leading to no errors at all. In fact, even a slope of +9 is properly handled.

The RTS sample interpreter includes a slope compensator 504 to compensate for the nominal slope associated with the particular network type. Referring to FIG. 5, slope compensator 504 includes a nominal slope register 520 for storing a value equivalent to the sum of the nominal slope and 0.5, which is then rounded to an integer value. In the preferred embodiment of the present invention, the nominal slope register 520 stores the nominal slope value for T1 or E1 network types, is −1 and +2, respectively. However, as one skilled in the relevant art would find apparent, any nominal slope value associated with any type of network may be loaded into nominal slope register 520.

When slope compensator 504 receives current RTS sample slope 518 from RTS slope determinator 502, slope compensator 504 provides it to a current input of subtractor 524. Slope compensator 504 retrieves nominal slope adjustment value 522 from nominal slope register 520 and provides it to a nominal input of subtractor 524. Subtractor 524 subtracts the nominal slope from the current slope to generate a scaled RTS sample slope 526.

Scaled RTS sample slope 526 is then translated by sign extender 528. As noted above, sign extender 528 changes the sealed RTS sample slope from a range of 0 to 15 to a range of +7 to −8, referred to as adjusted RTS sample slope 530.

Then, the nominal slope is added back into the adjusted RTS sample slope 530. That is, nominal slope adjustment value 522 is provided to the nominal input of adder 532 and the adjusted RTS sample slope is provided to the difference input of adder 532. Adder 532 then adds the two values, rescaling the adjusted RTS sample slope to result in compensated RTS sample slope 534.

By removing the nominal slope adjustment value 522 and adding it back to the RTS sample slope after the sign extension, the range of usable RTS values available for interpreting the RTS sample slope 518 is increased. For example, in conventional SRTS clock recovery systems operating on an E1 network, if the source RTS sample slope was 8, it would be misinterpreted as −8 as a result of the conversion. However, in the present invention, the nominal slope adjustment value of 2 (1.06 +0.5 rounded to an integer value of 2) would first be subtracted by subtractor 524 to result in a scaled RTS sample slope 526 of 7. This results in sample extender 528 generating a value also equal to 7. Then adder 532 adds the nominal slope adjustment value 522 to the adjusted RTS sample slope 530 to result in a compensated RTS sample slope 534 of 8. Likewise, for a T1 network, an RTS sample of −9 and −10 would be misinterpreted by conventional SRTS clock recovery systems and correctly interpreted by the present invention.

As a result of interpreting the RTS sample difference in this manner, the range of usable RTS sample values is sealed from centering on −0.5 to centering closely as possible on the E1 average slope of +1.06 or the T1 center of −1.91. The inventive technique shifts the RTS sample values to center about these anticipated RTS sample slope values, thereby increasing the ability of the SRTS clock recovery system to correctly recognize and interpret RTS sample slope values with substantial jitter.

As noted, RTS sample interpreter 707 also includes an RTS range extender 506. Range extender 506 receives compensated RTS sample slope 534 and expands the range of values of the RTS sample to ensure that the SRTS timing controller properly determines the source and transmit clock phases.

Range extender 506 includes an extended range register 536 for storing an accumulated RTS sample. Extended range register 536 is preferably a 32 bit register, enabling the stored RTS sample to accumulate to a 32 bit length.

However, it is understood that the accumulated length may be any length larger than 4 bits. An adder 538 adds the accumulated sample 540 with compensated RTS sample slope 534 to generate an extended range RTS sample, referred to above as the interpreted RTS sample. Accumulated sample 540 represents the total phase between the source or destination clock and network reference clock. Specifically, compensated RTS sample slope 534 is provided to a D input of adder 538. Likewise, accumulated RTS sample 540 is provided to an N input of adder 538. Adder 538 thereafter generates accumulated RTS sample value 540. This value is also provided to the SRTS timing controller as interpreted RTS sample 542.

In the preferred embodiment of the present invention, extended range register 536 and adder 538 are configured with a 32-bit range due to the implementing architecture. However, as one skilled in the relevant art would find apparent, the resulting accumulated RTS sample 540 may have any range suitable for a particular application. Typically, extending the range of the RTS samples to 8 or 16 bits is sufficient for most applications.

Thus, the slope compensator scales the range of RTS sample slopes to compensate for the expected average slope and thereby increase the range of usable RTS sample slope values that can represent non-systemic jitter, while the range extender increases the number of phase values that the RTS samples can represent to accommodate large phase differences between the source and destination clock signals. These two aspects of the present invention are not mutually dependent; the RTS sample interpreter may be implemented solely with slope determinator 502 and slope compensator 504. Likewise, the RTS sample interpreter may be implemented solely with slope determinator 502 and range extender 506.

In the preferred embodiment of the present invention, the above features of the SRTS clock recovery system are performed in microcode, which is executed by hardware implemented in an ASIC. However, as one skilled in the relevant art would find apparent, the SRTS clock recovery system may be implemented in any form of hardware, software, or combination of hardware or software now or later developed.

Commonly-assigned U.S. patent application "System and Method for Maintaining Network Synchronization Utilizing Digital Phase Comparison Techniques With Synchronous Residual Time Stamps", attorney docket number 112023-0004, naming as inventors Gary S. Muntz, Steven E. Jacobs, and Guy Fedorkow, and filed concurrently herewith is hereby incorporated by reference in its entirety. Likewise, commonly-assigned U.S. patent application entitled "An Improved SRTS Clock Recovery System Implementing Adaptive Clock Recovery Techniques", attorney docket number 112023-0005, naming as inventors Gary S. Muntz and Steven E. Jacobs, and filed concurrently herewith is hereby incorporated by reference in its entirety.

Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In a synchronous residual time stamp (SRTS) clock recovery system for ensuring proper reception and transmission of an information stream transmitted by a source node over a network having a network reference clock, the information stream including data to be transmitted to a destination user process and a residual time stamp (RTS) representing a phase difference between a source node clock and a reference clock, an RTS sample interpreter for enabling the SRTS clock recovery system to operate in a high jitter network environment, the RTS sample interpreter comprising:

a slope determinator configured to determine the slopes of source RTS and destination RTS samples;

a slope compensator configured to scale the ranges of said sample slopes to compensate for the expected average slope; and     a range extender, coupled to said slope compensator, configured to increase the number of phase values of said samples to generate extended compensated samples.

2. The RTS sample interpreter of claim 1, wherein said slope determinator comprises:

a subtractor configured to subtract a previous RTS sample from a current RTS sample to generate a current RTS sample slope.

3. The RTS sample interpreter of claim 2, wherein said slope compensator comprises:

a range adjuster configured to adjust the range of said current RTS sample slope; and     first means for removing a nominal slope associated with the interface from said current RTS sample slope prior to said adjustment by said range adjuster and for replacing said nominal slope in said current RTS sample slope after said adjustment of said current RTS sample slope by said range adjuster.

4. The RTS sample interpreter of claim 3, wherein said first means comprises:

a subtractor for subtracting said nominal slope from said current RTS sample slope; and     an adder for adding said nominal slope to said adjusted current RTS sample slope to generate said compensated RTS sample slope.

5. The RTS sample interpreter of claim 1, wherein said range extender comprises:

second means for accumulating successive compensated RTS samples to generate said extended compensated samples having a range greater than said range of said source and destination samples.

6. The RTS sample interpreter of claim 5, wherein said second means comprises:

temporary storage means for storing accumulated values of said successive current RTS sample slopes; and     an adder for adding said successive current RTS sample slopes to said accumulated RTS sample to generate said extended compensated samples.

7. The RTS sample interpreter of claim 6, wherein said temporary storage means comprises an extended range register.

8. The RTS sample interpreter of claim 3, wherein said slope compensator further comprises means for generating said nominal slope.

9. In a synchronous residual time stamp (SRTS) clock recovery system for ensuring proper reception and transmission of an information stream transmitted by a source node over a network having a network reference clock, the information stream including data to be transmitted to a destination user process and a residual time stamp (RTS) representing a phase difference between a source node clock and a reference clock, an SRTS timing controller for generating an error signal representing a current phase difference between said transmit clock and said source clock, said SRTS timing controller comprising:

an RTS sample interpreter for enabling the SRTS clock recovery system to operate in a high jitter network environment, the RTS sample interpreter including,         a slope determinator configured to determine the slopes of source RTS and destination RTS samples,         a slope compensator configured to scale the ranges of said sample slopes to compensate for RTS sample nominal slope, and         a range extender, coupled to said slope compensator, configured to increase the range of phase values of said RTS samples to generate extended compensated samples.

10. The SRTS timing controller of claim 9, further comprising:

a first subtractor configured to subtract said extended compensated destination slope from said extended compensated source slope to determine a current difference between said source clock phase and said transmit phase; and     a second subtractor for subtracting a target RTS sample difference from said current RTS sample difference to generate said error signal.

11. The SRTS timing controller of claim 10, further comprising:

means for generating said target RTS sample difference.

12. The SRTS timing controller of claim 10, further comprising:

an RTS sample generator for generating said destination RTS sample.

13. A synchronous residual time stamp (SRTS) clock recovery system for ensuring proper reception and transmission of an information stream transmitted by a source node over a network having a network reference clock, the information stream including data to be transmitted to a destination user process and a residual time stamp (RTS) representing a phase difference between a source node clock and a reference clock, the SRTS clock recovery system comprising:

an SRTS timing controller for generating an error signal representing a current phase difference between said transmit clock and said source clock, said SRTS timing controller including,         an RTS sample interpreter for enabling the SRTS clock recovery system to operate in a high jitter network environment, the RTS sample interpreter generating an extended compensated source sample and an extended compensated destination sample, said extended compensated samples having an increased number of phase values to interpret phase differences between said source clock and said transmit clock,         a first subtractor configured to subtract said extended compensated destination sample from said extended compensated source sample to determine a current phase offset between said source clock and said transmit clock, and         a second subtractor for subtracting a target phase offset from said current phase offset to generate said error signal.

14. The SRTS clock recovery system of claim 13, further comprising:

a clock generation system configured to generate said transmit clock having said frequency responsive to said error signal and further configured to transmit said data to the destination user process at said transmit frequency.

15. The SRTS clock recovery system of claim 13, further comprising:
a network receiver configured to receive the information stream, said network receiver including,
a data FIFO for storing said received data, and
an RTS sample FIFO for storing said source RTS sample,
wherein said SRTS timing controller retrieves said source RTS sample from said RTS sample FIFO, and further wherein said clock generation system retrieves said data from said data FIFO for transmission to the destination process.

16. The SRTS clock recovery system of claim 15, wherein said network receiver further comprises:
a cell/packet receiver configured to parse said information stream into a plurality of portions, said plurality of portions including a first portion including said data and a second portion including said source RTS sample.

17. The SRTS clock recovery system of claim 14, wherein said clock generation system comprises:
a low pass filter configured to filter said error signal and to provide said accumulated filtered error signal to said control circuit.

18. The SRTS clock recovery system of claim 13, wherein said SRTS clock recovery system is included within a network node, said network node further comprising:
a reference clock processor configured to generate a fundamental reference clock and an SRTS reference clock relative to the network reference clock,
wherein said RTS sample generator utilizes said SRTS reference clock to generate said destination RTS sample.

19. In a synchronous residual time stamp (SRTS) clock recovery system for ensuring proper reception and transmission of an information stream transmitted by a source node over a network having a network reference clock, the information stream including data to be transmitted to a destination user process and a residual time stamp (RTS) representing a phase difference between a source node clock and a reference clock, an RTS sample interpreter for enabling the SRTS clock recovery system to operate in a high jitter network environment, the RTS sample interpreter comprising:
a slope determinator configured to determine the slopes of source RTS and destination RTS samples; and
a slope compensator configured to scale the ranges of said sample slopes to compensate for nominal sample slope.

20. The RTS sample interpreter of claim 19, wherein said slope determinator comprises:
a subtractor configured to subtract a previous RTS sample from a current RTS sample to generate a current RTS sample slope.

21. The RTS sample interpreter of claim 20, wherein said slope compensator comprises:

a range adjuster configured to adjust the range of said current RTS sample slope; and
first means for removing a nominal slope associated with the interface from said current RTS sample slope prior to said adjustment by said range adjuster and for replacing said nominal slope in said current RTS sample slope after said adjustment of said current RTS sample slope by said range adjuster.

22. The RTS sample interpreter of claim 21, wherein said first means comprises:
a subtractor for subtracting said nominal slope from said current RTS sample slope; and
an adder for adding said nominal slope to said adjusted current RTS sample slope to generate said compensated RTS sample slope.

23. In a synchronous residual time stamp (SRTS) clock recovery system for ensuring proper reception and transmission of an information stream transmitted by a source node over a network having a network reference clock, the information stream including data to be transmitted to a destination user process and a residual time stamp (RTS) representing a frequency difference between a source node clock frequency and a frequency of the reference clock, an RTS sample interpreter for enabling the SRTS clock recovery system to operate in a high jitter network environment, the RTS sample interpreter comprising:
a slope determinator configured to generate a current RTS sample slope representing the difference between the slopes of the source RTS and destination RTS samples; and
a range extender, coupled to said slope determinator, configured to increase the number of phase values of said current RTS sample slope to generate an extended sample slope.

24. The RTS sample interpreter of claim 23, wherein said slope determinator comprises:
a subtractor configured to subtract a previous RTS sample from a current RTS sample to generate said current RTS sample slope.

25. The RTS sample interpreter of claim 23, wherein said range extender comprises:
means for accumulating successive RTS sample slopes to generate said extended sample slope having a range greater than said range of said source and destination sample slopes.

26. The RTS sample interpreter of claim 25, wherein said accumulating means comprises:
an temporary storage means for storing accumulated values of said successive current RTS sample slopes; and
an adder for adding said successive current RTS sample slopes to said accumulated RTS sample slopes to generate said extended sample slope.

27. The RTS sample interpreter of claim 26, wherein said temporary storage means comprises an extended range register.

* * * * *